（12）United States Patent
Ishida (10) Patent No.: US 6,369,957 B1
(45) Date of Patent: Apr. 9, 2002

(54) SOLID IMMERSION LENS AND PRODUCTION METHOD THEREOF

(75) Inventor: Futoshi Ishida, Takatsuki (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/392,646

(22) Filed: Sep. 9, 1999

(30) Foreign Application Priority Data

Sep. 16, 1998 (JP) ............................................. 10-261887

(51) Int. Cl.⁷ ................................................ G02B 27/10
(52) U.S. Cl. ..................................... 359/719; 369/44.14
(58) Field of Search ................................ 359/718, 719, 359/721, 664, 811, 813; 369/112.01, 44.14, 44.23, 44.22, 43, 112.23

(56) References Cited

U.S. PATENT DOCUMENTS

| | | | |
|---|---|---|---|
| 5,004,307 A | 4/1991 | Kino et al. .................. 359/356 |
| 5,125,750 A | 6/1992 | Corle et al. .................. 359/819 |
| 5,497,359 A | * 3/1996 | Mamin et al. ........... 369/44.15 |
| 5,729,393 A | * 3/1998 | Lee et al. .................... 359/819 |
| 5,764,613 A | 6/1998 | Yamamoto et al. ......... 369/112 |
| 5,774,281 A | 6/1998 | Maeda et al. ............... 359/822 |
| 5,786,947 A | 7/1998 | Maeda et al. ............... 359/822 |
| 6,055,222 A | * 4/2000 | Knight ....................... 369/112 |

FOREIGN PATENT DOCUMENTS

JP         8-212579         8/1996

* cited by examiner

Primary Examiner—Ricky Mack
Assistant Examiner—Evelyn A. Lester
(74) Attorney, Agent, or Firm—McDermott, Will & Emery (57) ABSTRACT

A solid immersion lens has a positioning surface and a surface including a convex surface forming an effective optical path. The solid immersion lens has a hemispherical or hyperhemispherical shape provided with a convex surface on the light entering side and an approximate plane surface on the light exiting side.

15 Claims, 6 Drawing Sheets

SOLID IMMERSION LENS AND PRODUCTION METHOD THEREOF

CROSS-REFERENCE TO RELATED APPLICATIONS

This application is based on Patent Application No. 10-261887 filed in Japan, the content of which is hereby incorporated by reference.

BACKGROUND OF THE INVENTION

1. Field of the Invention

The present invention relates to a solid immersion lens and production method thereof, and specifically relates to a solid immersion lens used as a recording/reading head for a high resolution microscope probe or high density optical memory (recording/reading) and production method thereof.

2. Description of the Related Art

In the field of optical memory for optically recording/reading information, the following two methods have been proposed in recent years for increasing the recording density of disks used as a recording media.

(1) Shorten the wavelength of the light used for recording/reading.

(2) Increase the aperture number NA of the object lens converging the light on the disk.

Among these methods, method (1) requires the development of a semiconductor laser or the like for emitting light of a shorter wavelength to reduce the wavelength of the light itself. The development of such a semiconductor laser is not yet a simple matter, however.

Focusing on method (2), there have been various proposals for emitting the light used for recording/reading on a disk using a solid immersion lens. This method is based on the principle of the liquid immersion microscope (i.e., improved resolution microscope via liquid immersion method). That is, this method utilizes the principle of the microscope obtaining a resolution at less than 100 nm in visible light. Prior applications of related art include U.S. Pat. Nos. 5,004,307 and 5,764,613.

Figure 14:
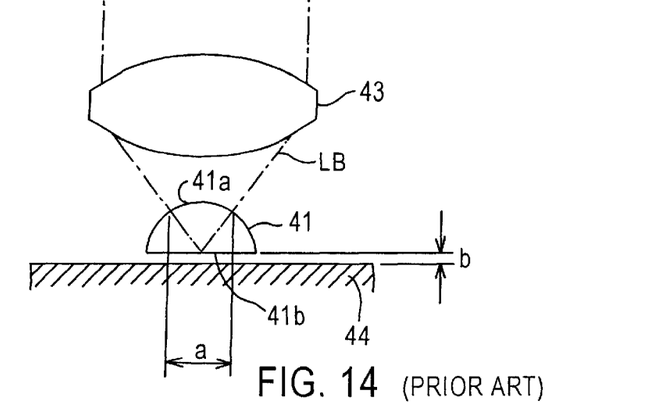
FIG. 14 is an elevation view of an optical system including a conventional solid immersion lens (hemispherical)
Figure 15:
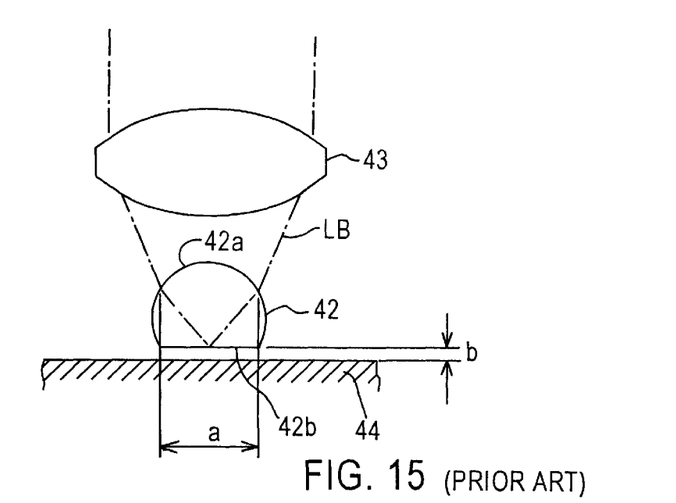
FIG. 15 is an elevation view of an optical system including a conventional solid immersion lens (hyperhemispherical)

Solid immersion lenses heretofore experimentally produced include the hemispherical solid immersion lens 41 shown in FIG. 14, and the hyperhemispherical solid immersion lens 42 having a cap piece remaining under the hemisphere as shown in FIG. 15. In FIGS. 14 and 15, reference number 43 refers to a normal objective (condenser) lens, and reference number 44 refers to a recording medium (disk).

In the hemispherical solid immersion lens 41, the light beam LB enters perpendicular to the concave surface 41a, and is converged by the plane surface 41b of the center area. When the refractive index of the solid immersion lens 41 is designated n, the wavelength within the lens 41 becomes 1/n, and as a result the aperture number NA of the condenser lens 43 becomes a multiple of n. The spot size of the light beam LB is reduced to 1/n, and the resolution becomes a multiple of n. That is, when the aperture number NA of the condenser lens 43 is 0.5, the refractive index n of the solid immersion lens 41 is 1.8, and the wavelength λ of the light beam LB is 780 nm, the spot size S is determined by equation (1) below; i.e., the spot size S is 430 nm.

$$S = \lambda/(2 \sin \theta) \quad (1)$$

In the hyperhemispherical solid immersion lens 42, the effective optical path is greater than the radius. In this instance, the spot size S of the light beam LB is determined by equation (2) below; i.e., the spot size S is 240 nm.

$$S = \lambda/(2n \sin \theta) \quad (2)$$

In this way, a condensed spot having a wavelength less than the used light can be obtained by using the solid immersion lenses 41 and 42. Using these methods, the spacing (air gap) b between the recording medium 44 and the solid immersion lens 41 and 42 must be sufficiently reduced so as to be maintained at approximately 100 nm or less. In order to control and maintain this air gap, it has been proposed to install the solid immersion lens on a floating slider applying the art of the magnetic hard disk. Prior art citations include U.S. Pat. Nos. 5,125,750, 5,774,281 and 5,786,947, and prior art citations using other than a floating slider include Japanese Laid-Open Application No. 8-212579.

The three issues below must be resolved to practicalize a high density memory using a solid immersion lens.

(1) Lens Holder Mechanism

Figure 16:
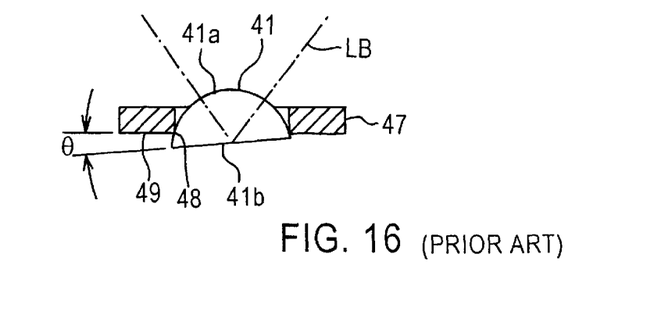
FIG. 16 is a section view of a support fixture and a conventional solid immersion lens.

In the conventional hemispherical and hyperhemispherical solid immersion lenses 41 and 42, it is difficult to prevent inclination (0 degree) of the plane surface 41b relative to the reference surface 49 of the support fixture 47 because there is no fixed reference to the support fixture 47 on the convex surface 41a, as shown in FIG. 16. When the plane surface 41b has a standard inclination, the fixed part of the lens disadvantageously protrudes to the object (medium) side of the lens, such that the required air gap cannot be ensured.

(2) Installation on the Slider

When installing a solid immersion lens on a floating slider for use as the recording head of a high density memory, the lens must be compact so as to have a diameter of 2 mm or less to reduce the head weight, and the lens support fixture must be provided with an air-bearing surface for floating. In this case, inclination between the support fixture and the lens plane surface must be prevented to maintain a sufficiently precise position of the solid immersion lens relative to the recording medium.

(3) Manufacturing Cost

Conventionally, hemispherical and hyperhemispherical solid immersion lenses are manufactured by grinding a glass member into a spherical shape to obtain a ball lens, then sectioning or grinding the ball lens. Such a production method, however, entails a complex process which raises the cost and is presently only in the experimental stage which does not result in a usable product.

SUMMARY OF THE INVENTION

An object of the present invention is to provide an improved solid immersion lens and production method thereof.

Another object of the present invention is to provide a solid immersion lens capable of being mounted so as to hold a predetermined position without inclination relative to a support fixture, and further capable of being mounted on a floating slider so as to sufficiently reduce the air gap with an object (medium).

Still another object of the present invention is to provide a production method capable of mass production of a solid immersion lens via a simple process at low cost.

These objects are attained by a first solid immersion lens of the present invention provided with a hemispherical shape or hyperhemispherical shape having a convex surface on the light entering side and an approximately plane surface on the light exiting side, wherein the convex surface comprises a positioning surface and a surface forming an effective optical path part. In this first solid immersion lens, it is desirable that the positioning surface is a curved surface having the opposite sign of the curvature of the surface forming the effective optical path part. Furthermore, includes a radius of curvature of infinity, i.e., a circular conical shape extending the tangent line of the radius at the effective optical path part.

A second solid immersion lens of the present invention provided with a hemispherical shape or hyperhemispherical shape having a convex surface on the light entering side and an approximately plane surface on the light exiting side, wherein a collar part having a positioning surface is provided outside the effective optical path part of the convex surface.

In the first and second solid immersion lenses, the positioning surface formed outside the effective optical path part of the convex surface comprises a fixed reference for the lens support fixture, and allows the solid immersion lens to be supported with excellent positioning (i.e., without inclination). Furthermore, the a sufficiently small air gap is ensured without the fixed part of the lens protruding on the object (medium) side.

Even when the lens is compact, the surface area of the approximate plane surface on the exit side is enlarged by providing the positioning surface, such that when the solid immersion lens is installed on a floating slider, the air-bearing surface is enlarged when floating. In addition to effectively preventing inclination, there is improved positioning accuracy of the solid immersion lens relative to the object (medium).

In the first solid immersion lens, the convex surface may comprise a first convex surface forming an effective optical path for forming a converged spot in the center of the approximate plane surface, and a second convex surface forming an effective optical path forming a converged spot at a location slightly separated from the approximate plane surface. In this way, a bifocal solid immersion lens can be obtained.

The first and second solid immersion lenses are manufactured by pressure molding a softened glass member using both a mold having a concave surface approximately inverting the convex shape, and a mold having a surface forming an approximate plane surface on the light exiting side. The pressure molding method using such molds allows inexpensive mass production of a solid immersion lens by a simple process which does not require cutting or grinding. If molten glass is dripped onto a mold having a surface for forming an approximate plane surface or having a concave surface approximately inverting the convex surface shape, the weight of the dripped glass can be evenly balanced so as to obtain a solaced immersion lens without dispersion.

BRIEF DESCRIPTION OF THE DRAWINGS

These and other objects and features of the present invention will become clear from the following description, taken in conjunction with the preferred embodiments with reference to the accompanying drawings, in which.

DESCRIPTION OF THE PREFERRED EMBODIMENTS

The preferred embodiments of the solid immersion lens and production method thereof of the present invention are described hereinafter with reference to the accompanying drawings.

Figure 1:
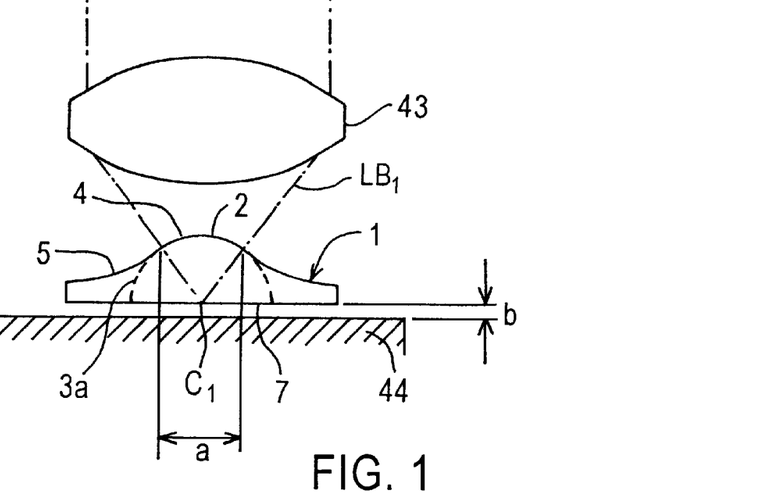
FIG. 1 shows an elevation view of an optical system including a solid immersion lens of a first embodiment.
Figure 2:
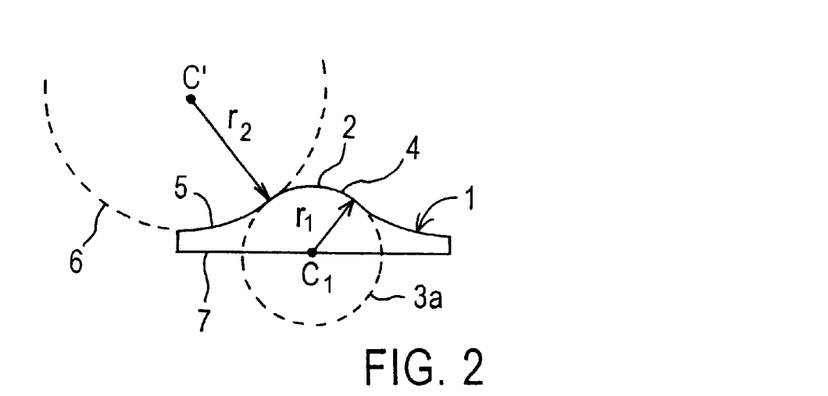
FIG. 2 illustrates the positioning surface and the effective surface of the solid immersion lens shown in FIG. 1.
Figure 3:
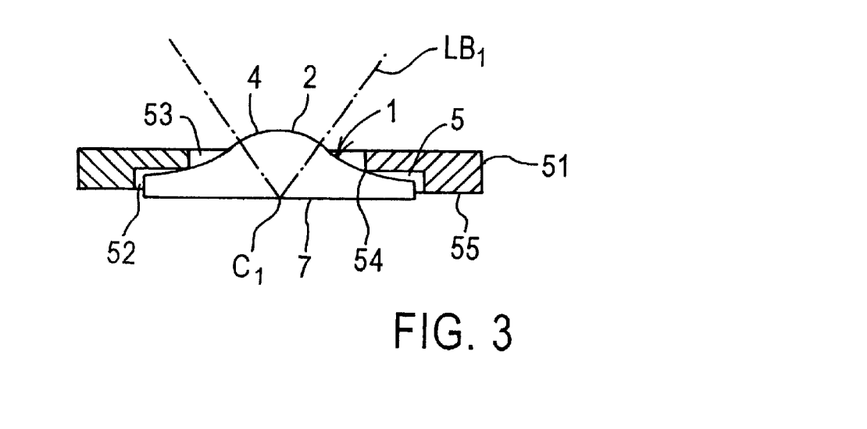
FIG. 3 is a section view of the support fixture and the solid immersion lens of FIG. 1.

Solid Immersion Lens of the First Embodiment (refer to FIGS. 1, 2, 3)

In FIG. 1, reference number 1 refers to the solid immersion lens of a first embodiment, reference number 43 refers to a condensing lens having a aperture number NA of approximately 0.6, reference number 44 refers to a recording medium, and reference number LB1 refers to converged light condensed by the condensing lens 43, and having a opening angle from the condensed spot C1 of approximately 74°. An air gap b between the solid immersion lens 1 and the recording medium 44 is set at approximately 100 nm.

The solid immersion lens 1 comprises a convex surface having a hemisphere 3a of radius r1 of 0.5 mm as a standard, and a plane surface 7 on the exit side. The effective surface 4 which transmits the converged light LB1 is the spherical surface having hemisphere 3a of 0.4 mm, and the effective diameter a is 0.6 mm. A positioning surface 5 having a curvature of opposite sign is provided on the exterior side of the effective surface 4. The diameter of the plane surface 7 is 2 mm.

The positioning surface 5 is defined as the "surface having a curvature of opposite sign." In other words, the direction of the curvature center of the positioning surface 5 is inverted relative to the direction of the curvature center of the effective surface 4. As shown in FIG. 2, the curvature center C1 of the spherical surface 3a forming the effective surface 4 exists in the center of the plane surface 7, and is positioned on the object side as the boundary of the convex surface 2. On the other hand, the curvature center C' of the spherical surface 6 having a radius r2 of 1 mm and forming the positioning surface 5 exists on the light source side as the boundary of the convex surface 2.

When the converged light LB1 irradiates the recording medium 44 using the optical system shown in FIG. 1 including the solid immersion lens 1, a recording spot 80 nm in diameter is obtained on the recording medium 44.

The installation of the solid immersion lens 1 on the floating slider is accomplished using the support fixture 51 shown in FIG. 3. The support fixture 51 has a concentric circle concavity 52, and an opening 53, and the solid immersion lens 1 is set in the concavity 52 such that the effective surface 4 protrudes from the opening 53. At this time, the solid immersion lens 1 is positioned by abutting the positioning surface 5 against the ring edge 54 of the support fixture 51. In the solid immersion lens 1 of the aforesaid shape, the lens 1 abutment line (i.e., the ring line on the positioning surface 5) is clearly delineated relative to the ring edge 54 which acts as a lens 1 position-regulating element, and the lens 1 is mounted on the support fixture 54 with excellent precision. In particular, the lens plane surface 7 can be mounted on the reference surface 55 of the bottom surface of the support fixture 51 with a precision on the order of micron to submicron. The surface area of the plane surface 7 is increased by forming the positioning surface 5 (approximately 4× the surface area of a conventional lens of the same diameter), such that the lens 1 itself receives a large floating force.

Relatedly, in the conventional support fixture shown in FIG. 16, innumerable abutment ring lines of the lens 41 are present relative to the ring edge 48 to abut the convex surface (spherical surface) 41a against the ring edge 48 of the support fixture 47. Accordingly, the angle θ increases due to disruption of the parallel relationship of the lens plane surface 41b and the reference surface 49 of the support fixture 47, such that the obtainable mounting precision is only at most on the order of submillimeter.

The solid immersion lens functioning as a bifocal lens is described below.

Figure 4:
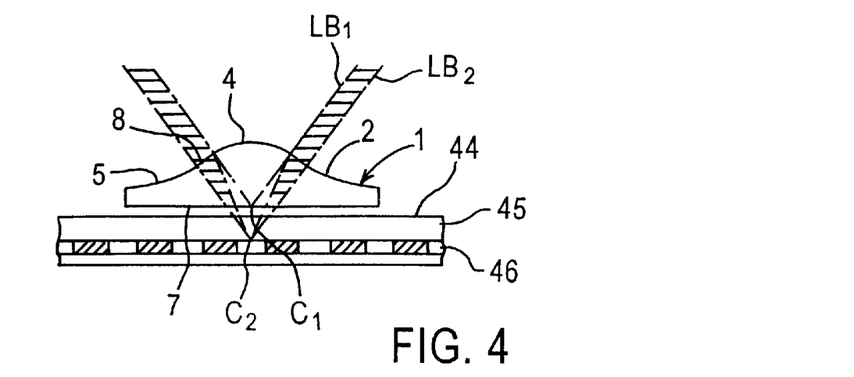
FIG. 4 illustrates the solid immersion lens of FIG. 1 used as a bifocal lens.

The solid immersion lens 1 has a convex surface 2 comprising an effective surface 4 and a positioning surface 5, as previously mentioned. As shown in FIG. 4, a single converged light beam LB2 on the outer surface of the converged light LB1 is directed. The converged light LB1 is transmitted through the effective surface 4 and forms a condensed light spot C1 at the center of the plane surface 7, and the converged light LB2 is transmitted through the interface 8 of surfaces 4 and 5 and forms a condensed light spot C2 at a position slightly separated from the spot C1.

The recording medium 44 is provided with a tracking layer 46 below a recording layer 45. Using the solid immersion lens 1, information is recorded/read on the recording layer 45 via the condensed light spot C1, and the tracking layer 46 can be accessed via the condensed light spot C2. In this case, the installation of the solid immersion lens 1 on the floating slider may be accomplished using the support fixture 51 shown in FIG. 3.

Figure 5:
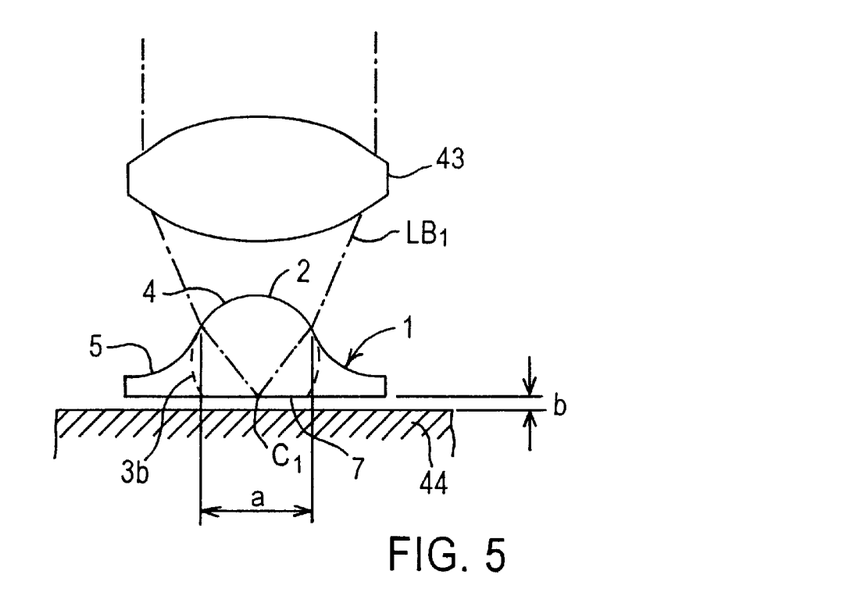
FIG. 5 is an elevation view showing an optical system including a solid immersion lens of a second embodiment.

Solid Immersion Lens of the Second Embodiment
(Refer to FIG. 5)

In FIG. 5, the solid immersion lens 1 of the second embodiment comprises a convex surface 2 having hyperhemisphere 3b as a reference surface with a radius of 0.5 mm, and a plane surface 7 on the exit side, wherein the diameter of the effective surface 4 is approximately 0.7 mm. In other aspects the construction is identical to that of the first embodiment; parts common to FIG. 1 are designated by like reference numbers and are not described further. The condenser lens 43 has an aperture number NA of approximately 0.4, and when the recording medium 44 is irradiated by convergent light LB1, the obtained recording spot has a diameter of 80 nm on the recording medium 44.

Installation of the solid immersion lens 1 on the floating slider may be accomplished using the support fixture 51 shown in FIG. 3, such that the abutment line of the positioning surface 5 is clearly delineated relative to the ring edge 54, and the plane surface 7 of the lens 1 is supported with high precision so as to maintain a small air gap b of approximately 100 nm.

Figure 6:
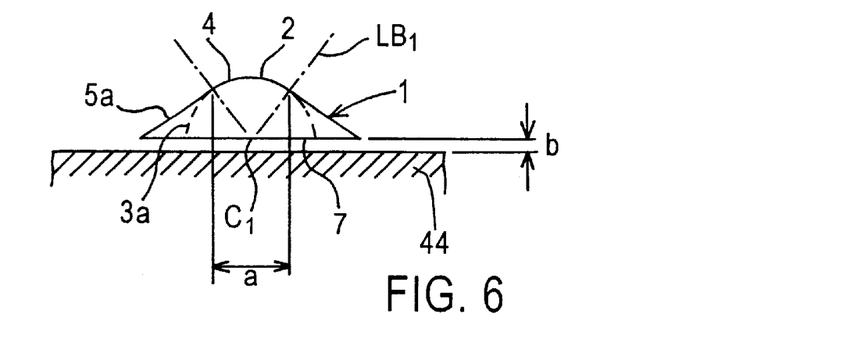
FIG. 6 shows a solid immersion lens of a third embodiment.

Solid Immersion lens of the Third Embodiment
(Refer to FIG. 6)

In FIG. 6, the solid immersion lens 1 of the third embodiment comprises a convex surface 2 having hyperhemisphere 3b as a reference surface with a radius of 0.5 mm similar to the first embodiment, and a circular cone positioning surface 5a (the curvature center is on the top surface) having a curvature of zero on the exterior side of the effective surface 4.

In this hemispherical solid immersion lens 1, a recording spot 80 nm in diameter is obtained on the recording medium 44 when recording using the condenser lens 43 shown in FIG. 1. Installation of the solid immersion lens 1 on the floating slider may be accomplished using the support fixture 51 shown in FIG. 3, such that the abutment line of the positioning surface 5 is clearly delineated relative to the ring edge 54, and the plane surface 7 of the lens 1 is supported with high precision so as to maintain a small air gap b.

Figure 7:
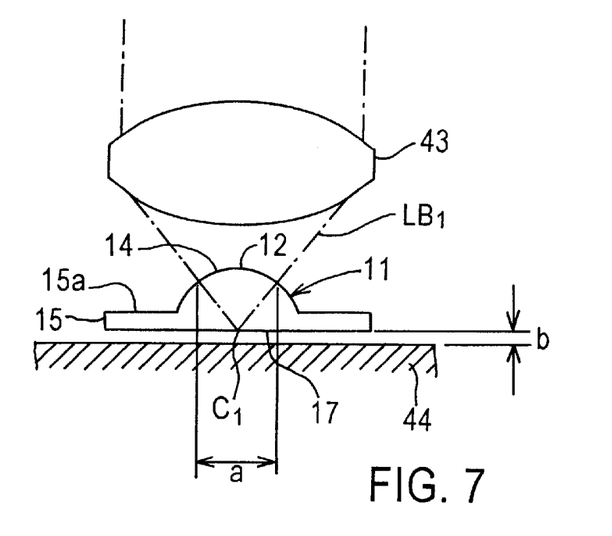
FIG. 7 is an elevation view showing an optical system including a solid immersion lens of a fourth embodiment.
Figure 8:
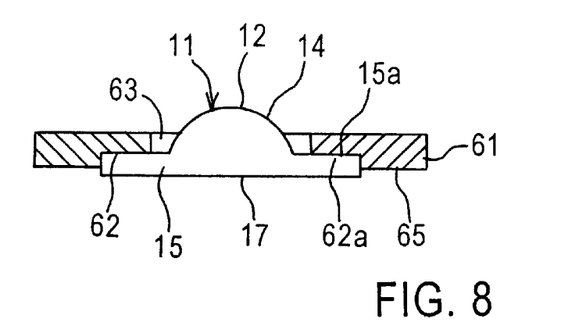
FIG. 8 shows a section view of a support fixture and the solid immersion lens of FIG. 7.
Figure 9:
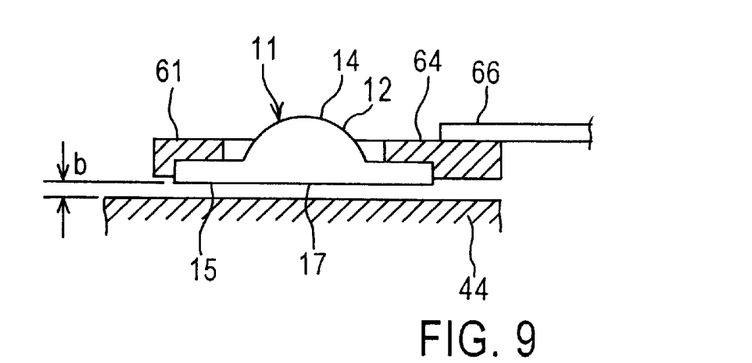
FIG. 9 is a section view showing the float-regulating mechanism of the support fixture of FIG. 8.

Solid Immersion Lens of the Fourth Embodiment
(Refer to FIGS. 7, 8, 9)

In FIG. 7, the solid immersion lens 11 of the fourth embodiment is constructed of a convex surface 12 comprising an effective surface 14 and a collar 15 provided on the exterior side of the effective surface 14, and a plane surface 17 on the exit side. The effective surface 14 is a hemisphere 0.5 mm in radius as a reference, and an effective diameter a of approximately 0.6 mm. A collar 15 is 0.2 mm in thickness, and has a positioning surface 15a which is perpendicular to the optical path of the converged light LB1. The diameter of the plane surface 17 is 2 mm. The condenser lens 43 has an aperture number NA of approximately 0.6 similar to that of the first embodiment, such that the convergent light LB1 converges at an opening angle of approximately 74° from the condensed light spot C1. An air gap b of approximately 100 nm is set between the lens plane surface 17 and the recording medium 44.

When the convergent light LB1 irradiates the recording medium 44 using the optical system of FIG. 7 including the solid immersion lens 11, a recording spot 80 nm in diameter is obtained on the recording medium 44.

Installation of the solid immersion lens 11 on the floating slider may be accomplished using the support fixture 61 shown in FIG. 8. That is, the support fixture 61 has a concentric circle concavity 62 and an opening 63, and the solid immersion lens 11 is set in concavity 62 such that the effective surface 14 protrudes from the opening 63. At this time, the solid immersion lens 11 is positioned by abutting the positioning surface 15a of the collar 15 against the plane surface 62a of the concavity 62. In this way, the lens plane surface 17 can be fixed relative to the reference surface 65 of the bottom surface of the support fixture 61 with a precision on the micron to submicron order by positioning the lens 11 by abutting the positioning surface 15a against the plane surface 62a of the support fixture 62. The surface area of the lens plane surface 17 is increased by providing the collar 15 (i.e., 4× the surface area of a conventional lens of identical diameter), and the lens 11 itself receives a large floating force.

To maintain an air gap b of approximately 100 nm between the recording medium 44 and the plane surface 17 of the lens 11, the surface 64 of the support fixture 61 may be pressed by a suspension 66, as shown in FIG. 9.

Figure 10:
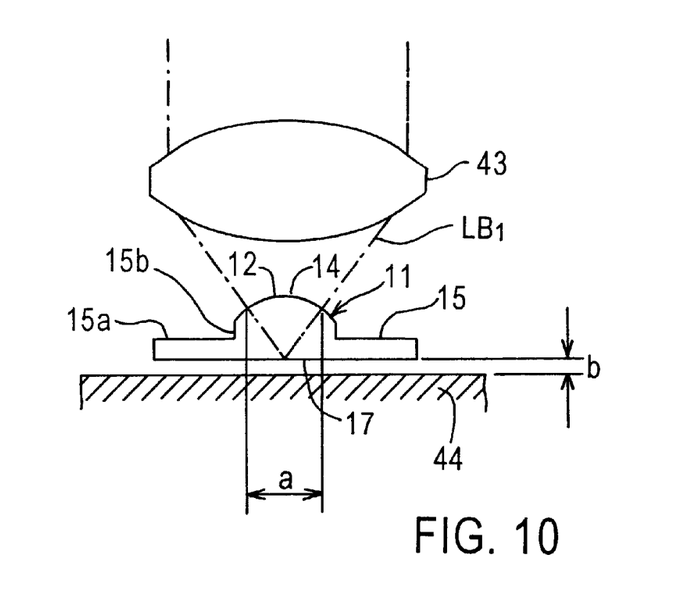
FIG. 10 is an elevation view showing an optical system including a solid immersion lens of a fifth embodiment.
Figure 11:
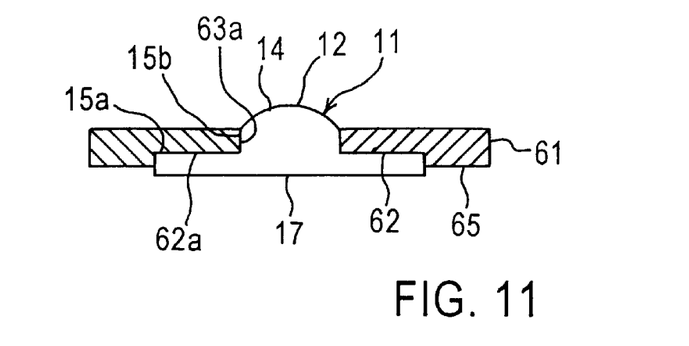
FIG. 11 is a section view of a support fixture and the solid immersion lens of FIG. 10.

Solid Immersion Lens of the Fifth Embodiment (Refer to FIGS. 10, 11)

In FIG. 10, the solid immers9oon lens 11 of the fifth embodiment has a construction basically similar to that of the fourth embodiment. A differing aspect is the formation of a single positioning surface 15b connected to the collar 15 parallel to the optical path on the exterior side of the effective surface 14.

In this solid immersion lens 11, in addition to the positioning surface 15a abutting the plane surface 62a of the support fixture 61, the single positioning surface 15b is positioned by abutting the interior surface 63a of the opening, so as to regulate inclination and horizontal dislocation of the lens 11.

Figure 12:
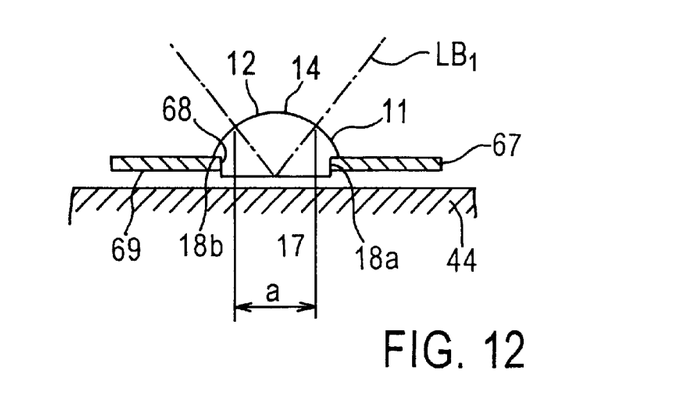
FIG. 12 is a section view of a support fixture and the solid immersion lens of a sixth embodiment.

Solid Immersion Lens of the Sixth Embodiment (Refer to FIG. 12)

In FIG. 12, the solid immersion lens 11 of the sixth embodiment is provided with an effective surface 14 identical to that of the fifth embodiment, and has a positioning surface 18a parallel to the optical axis, and a positioning surface 18b perpendicular to the optical axis. A support fixture 67 is provided with an opening 68 into which the positioning surface 18a is inserted, such that the solid immersion lens 11 can be accurately positioned by using the positioning surfaces 18a and 18b and the interior wall surface and opening top edge of the support fixture 67 as references. That is, the precision of the lens plane surface 17 is improved relative to the reference surface 69 of the support fixture 67.

This solid immersion lens 11 is particularly effective when weight reduction of the lens unit is an important design issue.

Production Method of the First Embodiment (Refer to FIG. 13)

FIG. 13 illustrates the method for producing the solid immersion lens 11 of the fourth embodiment shown in FIG. 7. Although the direct press method utilizing glass droplets is used, various well-known conventional methods may be used as a glass molding method using a mold.

Figure 13A:
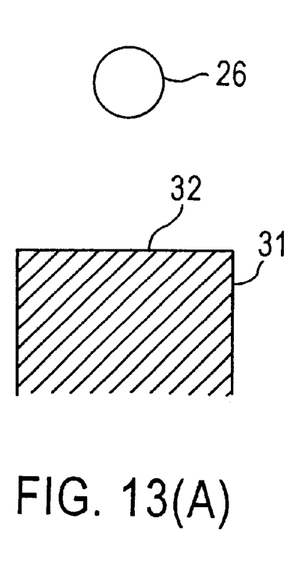
FIG. 13 illustrates a first embodiment of the process of the production method.

In FIG. 13(A), a glass material 25 is directed from a melting furnace (not illustrated) to a nozzle 20. A dense flint glass SF57 (refractive index approximately if 1.85; Minolta Co., Ltd. optical glass product) may be used as the glass material 25. The glass material 25 is pre-melted in a melting furnace at approximately 900° C., and dripped onto the mold 31 as glass droplets 26 from the tip 21 of the nozzle 20.

Since the mold 31 forms the plane surface 17 of the solid immersion lens 11, it is made of hardened alloy, and the surface 32 is surface polished (maximum surface roughness: 0.03 μm). Since the mold 35 shown in FIG. 13(C) forms the convex surface 12 of the solid immersion lens 11, it is formed of hardened alloy, and is provided with a surface 36 corresponding to the effective surface 14 and a surface 37 corresponding to the positioning surface 15a of the collar 15, and the surfaces 36 and 37 are polished (maximum surface roughness: 0.03 μm). The molds 31 and 35 are heated when molding to approximately 380° C. by a heating means not shown in the drawings.

Figures 13B, 13C:
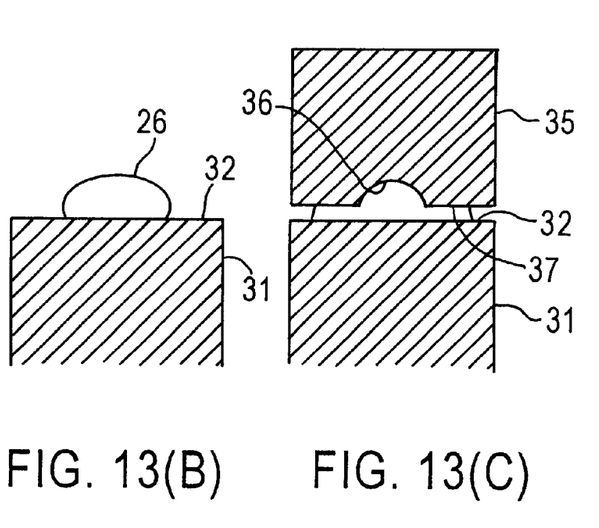

The glass droplet 26 dripped onto the mold 31 (Refer to FIG. 13(B)) is pressed by the mold 35 while in a softened state, so as to form a predetermined shape (Refer to FIG. 13(C)). At this time, the press pressure is set at approximately 50 kgf/cm², and the molds 31 and 35 are opened after pressing for 10 sec.

Production Method of the Second Embodiment

This production method uses a lanthanum glass LaSF9 (refractive index: approximately 1.85; Minolta Co., Ltd. optical glass product) as a glass material; the molding device and process are identical to those of FIG. 13. Since the glass material used in the second embodiment differs from the glass material used in the first embodiment, the melting temperature of the glass material is approximately 250° C., and the mold temperature is approximately 600° C., and the press pressure is set at approximately 60 kgf/cm².

Other Embodiments

The solid immersion lens of the present invention and the production method thereof are not limited to the previously described embodiments, and may be variously modified insofar as such modification does not depart from the scope of the invention.

In particular, the shape of the solid immersion lens may have an effective surface, a plane surface, and a positioning surface for positioning on the support fixture, and the shape of the detail parts is optional.

The production method has been described by way of example of the solid immersion lens of FIG. 7, but the solid immersion lenses of FIGS. 1, 5, 6, 10, and 12, as well as solid immersion lenses of other configurations may be produced using the same press process and glass material as raw material. When producing the solid immersion lenses shown in FIGS. 10 and 12, it is desirable that the surfaces 15b and 18a are provided with a slight inclination to improve separation characteristics from the mold. In the aforesaid embodiments, glass material was dripped onto the plane surface of a mold, but the glass material may also be dripped onto the concave surface of a mold.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A solid immersion lens comprising:
   a surface having a hemispherical or hyperspherical shape on a light entering side of the lens, said surface having a positioning surface and a convex surface forming an effective optical path; and
   an approximate plane surface on a light exiting side of the lens.

2. A solid immersion lens comprising:
   a positioning surface and a surface including a convex surface forming an effective optical path, said solid immersion lens having a hemispherical or hyperhemispherical shape with the convex surface on a light entering side of the lens and an approximate plane surface on a light exiting side of the lens, wherein the convex surface comprises
   a first convex surface portion forming the effective optical path for forming a condensed light spot at the center of the approximate plane surface, and
   a second convex surface portion forming the optical path for forming a condensed light spot at a location slightly separated from the approximate plane surface.

3. A solid immersion lens comprising:
a positioning surface and a surface including a convex surface forming an effective optical path, said solid immersion lens having a hemispherical or hyperhemispherical shape with the convex surface on a light entering side of the lens and an approximate plane surface on a light exiting side of the lens, wherein
the positioning surface is a curved surface having the opposite sign of the curvature of the surface forming the effective optical path part.

4. A solid immersion lens comprising:
a positioning surface and a surface including a convex surface forming an effective optical path, said solid immersion lens having a hemispherical or hyperhemispherical shape with the convex surface on a light entering side of the lens and an approximate plane surface on a light exiting side of the lens, wherein
the positioning surface is a circular conical surface extending the tangent of the surface forming the effective optical path part.

5. A solid immersion lens provided with a collar having a positioning surface outside an effective optical path part of a convex surface, said solid immersion lens having a hemispherical or hyperhemispherical shape provided with the convex surface on a light entering side of the lens and an approximate plane surface on a light exiting side of the lens.

6. The solid immersion lens claimed in claim 5, wherein the collar is provided with a positioning surface approximately perpendicular to the optical axis.

7. The solid immersion lens claimed in claim 5, wherein the collar is provided with a first positioning surface approximately perpendicular to the optical axis, and a second positioning surface approximately parallel to the optical axis.

8. A method for producing a solid immersion lens comprising a positioning surface and a convex surface of hemispherical or hyperspherical shape on a light entering side of the lens, and a approximate plane surface on a light exiting side of the lens, the positioning surface and the convex surface forming an effective optical path, said method comprising:
a process using a mold having a concave surface approximately inverting the hemispherical or hyperspherical shape of the convex surface and a surface approximately inverting a shape of the positioning surface on the light entering side of the lens, and a mold having a surface for forming an approximately planar surface on the light exiting side of the lens; and
a process for press forming softened glass material using the two molds to provide both the convex surface of hemispherical or hyperspherical shape and positioning surface on the light entering side of the lens, and the approximate plane surface on a light exiting side of the lens.

9. A method for producing a solid immersion lens comprising a positioning surface and a surface having a convex surface for forming an optical path on a light entering side of the lens, said method comprising:
a process using a mold having a concave surface approximately inverting a shape of the convex surface and a mold having a surface for forming an approximately planar surface on the light entering side of the lens; and
a process for press forming softened glass material using the two molds to provide the convex surface and positioning surface, wherein,
in the press forming process, molten glass material is dripped directly onto the mold having a surface for forming an approximately planar surface, or a concave surface approximately inverting the shape of the convex surface.

10. The method of producing a solid immersion lens claimed in claim 8, wherein a dense flint glass material having a refractive index of 1.8 or greater is used as the glass material.

11. The method of producing a solid immersion lens claimed in claim 8, wherein a dense lathanum flint glass material having a refractive index of 1.8 or greater is used as the glass material.

12. A method for producing a solid immersion lens provided with a collar having a positioning surface outside a convex surface forming an effective optical path part on a light entering side of the lens, said method comprising:
a process using a mold having a concave surface approximately inverting a shape of the convex surface and a mold having a surface for forming an approximately planar surface on the light entering side of the lens; and
a process for press forming softened glass material using the two molds.

13. The method for producing a solid immersion lens claimed in claim 12, wherein, in the press forming process, molten glass material is dipped directly onto the mold having a surface for forming an approximately planar surface, or a concave surface approximately inverting the shape of the convex surface.

14. The method of producing a solid immersion lens claimed in claim 12, wherein a dense flint glass material having a refractive index of 1.8 or greater is used as the glass material.

15. The method of producing a solid immersion lens claimed in claim 12, wherein a dense lanthanum flint glass material having a refractive index of 1.8 or greater is used as the glass material.

* * * * *